Jan. 4, 1966 — H. HUET ETAL — 3,227,433
METALLURGICAL FURNACES FOR VERY HIGH TEMPERATURES
Original Filed March 20, 1959

INVENTORS
Henri Huet
Maurice Delange
Paul Vertes
BY Bacon & Thomas
ATTORNEYS

United States Patent Office 3,227,433
Patented Jan. 4, 1966

3,227,433
METALLURGICAL FURNACES FOR VERY HIGH TEMPERATURES
Henri Huet, Le-Verger-Saint-Vrain, Maurice Delange, Ballencourt, and Paul Vertes, Mennecy, France, assignors to Commissariat a l'Energie Atomique, Paris, France
Continuation of abandoned application Ser. No. 800,853, Mar. 20, 1959. This application July 23, 1962, Ser. No. 213,569
Claims priority, application France, Mar. 24, 1958, 761,335
6 Claims. (Cl. 266—24)

This application is a continuation of our application Serial No. 800,853, filed March 20, 1959, now abandoned.

The present invention relates in a general way to those metallurgical furnaces which consist of a crucible and a bell, and are used for carrying out processes for the manufacture of chemical substances obtained as a result of a high-temperature reaction developed in the midst of a mixture.

More, particularly, the invention relates to furnaces of this type designed for the production of very pure uranium by the known processes involving a highly exothermic reaction between uranium tetrafluoride and a reducing metal, such as calcium.

Hitherto there have been primarily utilized for this purpose furnaces comprising a collecting crucible arranged underneath and as an extension of a receptacle open at the bottom, the crucible and the receptacle being made of a material which does not react with uranium, and which is entirely surrounded by a refractory material contained in an envelope which may be fluid-tight, and which forms a bell at the upper part of the receptacle.

With such crucible furnaces, wherein it is possible to operate if desired under a controlled atmosphere consisting, for example, of argon, there is obtained in the crucible an ingot of uranium metal sufficiently pure to be capable of being then subjected to shaping treatments, without it being necessary to effect a subsequent melting of the ingot. All that is necessary is first to clean the side and bottom surfaces of the ingot, and to cut off the top of the ingot, which is surmounted by scoria or slag formed in the course of production.

The aforementioned advantage of these crucible furnaces are, however, obtained with great difficulties of a technical nature and of industrial exploitation.

In point of fact, as mentioned above, the reaction intervening between uranium tetrafluoride and the reducing metal, such as calcium, is highly exothermic, so that the mass of the reacting substances is raised to a temperature of the order of 1800° C. The formidable problem to be solved consists, therefore, in bringing into operation, for the construction of the walls with which the reacting mass and the metal obtained are in contact, a refractory material which on the one hand does not react chemically with the reacting substances and the metal (uranium) obtained, and on the other hand is of sufficient mechanical strength at the high temperature to which it is raised.

In the case of the production of uranium by the reduction of uranium tetrafluoride by means of calcium, the refractory material utilized is calcium fluoride, which, in point of fact, does not react either with the reacting substances or with the metal obtained. Moreover its mechanical behavior at temperatures of the order of 1800° C. is adequate, at least for some hours.

In the furnaces hitherto utilized, however, in which the crucible and the vessel surmounting it are completely enclosed in a refractory material designed to isolate the highly oxidizable uranium from the surrounding atmosphere, the cooling of the crucible is effected very slowly, on account of its envelopment with this refractory material, which likewise constitutes a thermal screen; and since the mechanical behavior of the crucible in which the ingot is formed becomes rather indifferent at the end of a few hours, the state of the surface of this ingot is not of the highest quality.

It follows from the foregoing that the ingot obtained requires, on account of the condition of its surface, a subsequent mechanical treatment, and that moreover the complete cycle of the furnace, on account of the slowness of the cooling, extends over a period of about two days.

The object of the present invention is, therefore, to provide a furnace of the type set forth, which does not exhibit the serious disadvantages mentioned. With this end in view, it consists essentially in shaping and arranging in the usual manner the vessel with an open bottom initially containing the greater part of the mixture of reacting substances, and then in arranging the crucible in a novel manner such that its cooling is effected rapidly as soon as the molten metal has collected therein.

Thus, according to the invention, a furnace for the production of a very pure metallurgical product by reaction at a very high temperature in the midst of a mixture of reacting substances, comprising a vessel open at the bottom, which is lined with a refractory material and isolated from the exterior by a bell, and a crucible beneath this vessel, is characterized by the feature that the crucible is arranged in a jacket provided with cooling means.

According to the simplest form of construction, the crucible is placed in a jacket forming the lower part of the furnace, and provided with fins, which effect the cooling of the crucible, while also increasing the mechanical strength of this part of the furnace. The cooling of the fins is effected by air, or by a circulation of water, for example.

In addition to this essential feature, a furnace according to the invention also exhibits other particular and advantageous characteristics, designed in particular to facilitate its operation under a controlled atmosphere.

As has been set forth above, it is often useful to operate in such a manner that the mass of the reacting substances, and the product obtained, or both, will be isolated from the surrounding air. The problem of fluid-tightness thus posed is, however, difficult to solve, on account of the high temperature at which the reaction is effected. In the furnaces at present in use, sealing joints provided with a cooling system have been brought into operation for this purpose, the utilization of these joints being a comparatively delicate matter.

According to one particular form of construction of the invention, the furnace comprises: a thick steel plate supporting the aforementioned jacket of the crucible, the said plate having a central aperture, through which passes the lower part, with fins, of the jacket of the crucible; and a bell crowning the upper part of the crucible, and provided at its base with an annular flange to be fixed to a corresponding part of the supporting plate, the fluid-tightness between the flange and the plate being obtained by means of a system of two concentric sealing joints.

It will be understood that the utilization of a supporting plate thus enables the sealing system that has to be provided to be located in a relatively cool zone of the furnace.

The invention will be in every respect better understood by means of the following description of one example of construction, which is illustrated in the accompanying drawings, in which.

Figure 1:
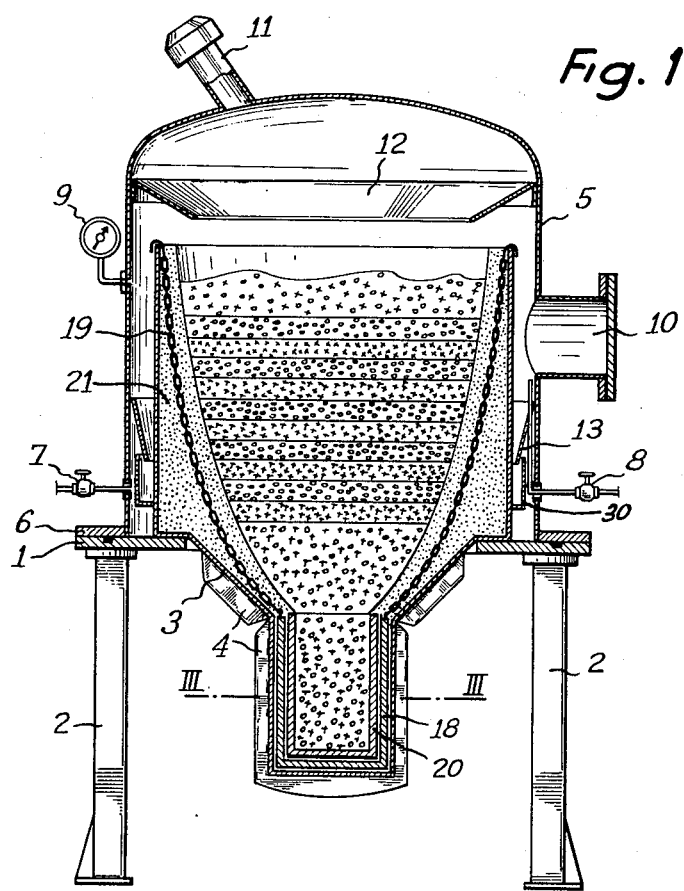
FIG. 1 represents in axial section a production furnace with bell and crucible according to the invention.

Referring now to FIG. 1, the furnace illustrated comprises a thick steel supporting plate 1, resting upon legs 2. The plate 1 supports a crucible jacket or vessel 3, the lower cylindrical and frusto-conical parts of which are provided with fins 4. A bell 5 covers the upper part of the crucible jacket 3, and, through the medium of an annular flange 6, rests upon the supporting plate 1. The bell 5 is equipped: with piping 7 connected to a vacuum pump, not shown; with piping 8 for the supply of inert gas, such as argon; with a pressure and vacuum gauge 9; with a lateral aperture 10 connected to a pressure-control system, not shown; with an ignition system 11; with a peripheral deflector 12 of generally frusto-conical configuration, returning to the crucible any particles splashed out; and with baffle plate 13 enabling any splashes that may have been able to escape from the jacket to be collected in the trough 30 mounted on the outer periphery of the vessel 3 immediately below the opening in the baffle plate 13.

Figure 2:
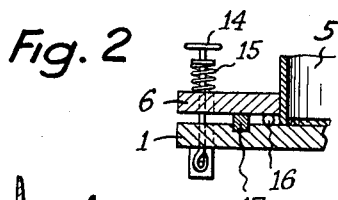
FIG. 2 shows in detail the method of fixing the bell of the furnace upon a supporting plate, and the sealing system utilized.
Figure 3:
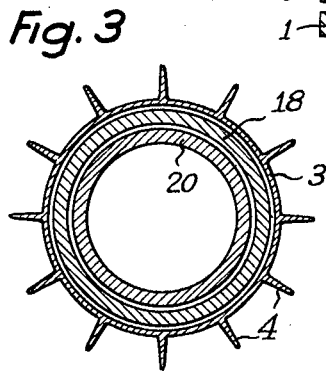
FIG. 3 is a view in section on the line III—III in FIG. 1.

In FIG. 2, the system of sealing and fixing the bell 5 upon the supporting plate 1 has been illustrated in detail. According to this figure, the annular flange 6 is fixed to the plate 1 by screw-threaded bolts with lugs 14 provided with springs 15. Fluid-tightness is ensured by means of two spaced peripheral joints; a first joint 16 consisting of a metallic torus filled with gas under pressure, nitrogen for example, and serving as a thermal joint, and a second joint 17, which is a plastic joint, of india rubber for example, serving as a fluid-tight sealing joint.

At the bottom of the crucible jacket 3 (FIG. 1) is arranged a metallic crucible 18 of refractory steel, connected to the upper part of the jacket 3 by chains 19.

The use of the furnace described above for the production of metallic uranium by the reduction of uranium tetrafluoride by means of calcium will now be described by way of example, but the invention is not limited to this particular use.

The bell 5 being raised, the chained crucible 18 is placed in the bottom of the crucible jacket 3. Then the crucible proper 20 made of ceramic material, fritted calcium fluoride for example, is placed inside the crucible 18. It is in this crucible 20 that the uranium metal obtained will be collected.

There is then packed around a central "shape," not shown, by pneumatic vibration of the latter for example, a brasque or metallurgical cement 21 consisting, for instance, of pulverulent fluor-spar. The shape is then withdrawn, and the space thereby left free is filled with uranium tetrafluoride and cuttings of calcium.

In order to spread out the duration of the reaction and to obviate splashes, the reacting substances are arranged in alternate layers in the central part of the furnace and are intimately mixed in the upper and lower parts, in order to ensure a good start and a good finish respectively of the reaction. The bell 5 is placed in position, and the closure thereof effected. The vacuum is produced by means of the piping 7, and then argon is introduced through the pipe 8. The reaction is started. The latter is almost instantaneous.

The furnace described above, and utilized in particular for the production of uranium metal, presents numerous advantages, namely: (a) the part of the crucible 20 situated underneath the supporting plate and designed to receive the product obtained is supported from a mechanical point of view by the metallic crucible 18 and the lower part of the jacket 3, the fins 4 of which facilitate rapid cooling, either by air or by water; (b) the use of a supporting plate such as the plate 1 enables the sealing system to be located in a cool zone, thus obviating the necessity for cooling the joints; (c) the use of calibrated springs 15 ensures protection of the apparatus in the event of an abnormal excess pressure, in the interior of the furnace; (d) the locating of the closure system of the furnace on a peripheral part of the plate 1 renders it possible to provide, between the bell and the crucible, a clearance space which serves as a buffer, and absorbs the sudden differences of pressure before the system of control that may be connected to the aperture 10 can come into operation; (e) it is possible to carry out the reaction in a vacuum or at any pressure, because of the combined joint system and expansion system; (f) the inner crucible 18, with chains, facilitates the manipulation of the product obtained in the form of an ingot; (g) the furnace as a whole, thus formed, may be either permanently fixed on legs, as illustrated in FIG. 1, or may be rendered mobile by mounting it on rails, as illustrated in FIG. 4.

Figure 4:
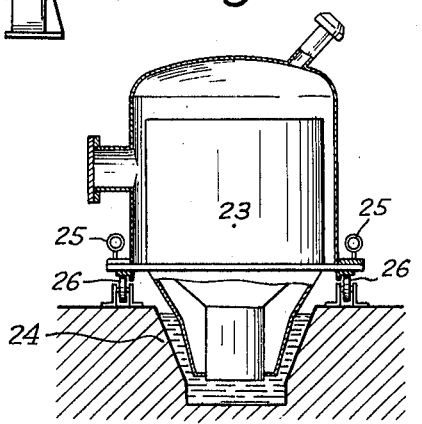
FIG. 4 shows one method of utilizing a production furnace such as that of FIGS. 1 to 3.

In FIG. 4, a movable furnace 23 has been shown, brought to the stage of cooling in a conduit 24, through which a current of water passes.

After the reaction, the furnace 23 may be brought into the conduit 24, either with a transporting carriage, or by means of a lifting system attached to hooks 25, or by sliding upon rails 26.

After some hours of cooling, the bell is raised, and the ingot obtained, which may for instance weigh about 100 kilograms, and which is surmounted by a mushroom-like head of slag, is drawn out by means of the chains. The slag is detached very easily from the fragments of crucibles still adhering thereto, by means of a scaling hammer for example.

The furnace described renders it possible to obtain, with a quantitative efficiency of the order of 98 or 99 percent, an ingot having a sufficiently clean surface, and of such purity that it can be passed on, without other treatment, to the operations of forging, wiredrawing or other extrusion processes, with a view to converting it into bars, or lining elements for nuclear reactors.

We claim:

1. A furnace for the production of a very pure metallurgical product by the reaction at very high temperatures of a mixture of reacting substances, comprising: a reaction vessel having the upper portion thereof lined with refractory material, said upper portion of said vessel having its upper end open for charging said vessel with said mixture of reacting substances and for removing the product resulting from the reaction of said reacting substances; a ceramic collecting crucible in the lower portion of said vessel with the upper edge of said crucible in contact with the lower edge of said refractory lining, to form a continuous lining for said vessel said crucible being disposed beneath said upper portion and being in continuous open communication with the interior of said upper portion for receiving therefrom the product of said substances reacting therein; and a jacket forming the lower portion of said vessel, said jacket closely surrounding and confining the walls of said collecting crucible and being provided with cooling means for cooling said crucible and product, a horizontal support plate having an aperture therein, said upper portion of said vessel having a cross section larger than said aperture and said lower portion having a cross section smaller than said aperture, said portions being joined by a connecting wall forming a shoulder resting on said plate with said lower portion depending through said aperture and disposed below said plate, and a removable bell supported in sealed relation on said plate and disposed in spaced surrounding relation about said upper portion providing a sealed vacuum chamber therearound.

2. A furnace as defined in claim 1 wherein the open end of said bell terminates in an outwardly extending annular flange positioned in spaced overlying relation above said plate about the aperture therein and with inner and outer spaced peripheral sealing means mounted on said plate about said aperture and positioned between said flange and said plate supporting said flange thereon, the inner of said seals comprising a continuous metallic tube filled with fluid under pressure forming a thermal barrier and the outer of said seals comprising a resilient annulus forming a fluid seal.

3. A furnace for the production of very pure metallurgical product by the reaction at very high temperatures of a mixture of reacting substances comprising: a reaction vessel having the upper portion thereof lined with refractory material, said upper portion of said vessel having its upper end open for charging the same with said mixture of reacting substances; a removable bell mounted in spaced surrounding relation around said vessel providing a sealed vacuum chamber therearound to insulate said vessel from the exterior; a collecting crucible in said vessel disposed beneath said upper portion and communicating with the interior thereof; a jacket forming the lower portion of said vessel surrounding said collecting crucible and being provided with cooling means, a metallic crucible disposed between said collecting crucible and said jacket; and non-extensible, metallic means for manipulating said metallic crucible attached at one end thereof to the upper edge of said metallic crucible and with the other end thereof extending upwardly to adjacent the upper edge of said vessel with the intermediate portion of said metallic means embedded in said refractory lining; said crucible being removable from said vessel only through said open upper end.

4. A furnace for the production of a very pure metallurgical product by the reaction at very high temperatures of a mixture of reacting substances, comprising: a reaction vessel having the upper portion thereof lined with refractory material, said upper portion of said vessel having its upper end open for charging said vessel with said mixture of reacting substances and for removing the product resulting from the reaction of said reacting substances; a removable bell mounted in spaced surrounding relation around said vessel and providing a sealed vacuum chamber therearound to insulate said vessel from the exterior; a ceramic collecting crucible in the lower portion of said vessel with the upper edge of said crucible in contact with the lower edge of said refractory lining to form a continuous lining for said vessel, said crucible being disposed beneath said upper portion and being in continuous open communication with the interior of said upper portion for receiving therefrom the product of said substances reacting therein; a collecting trough carried on the exterior wall of said vessel, said collecting trough extending entirely around the periphery of said vessel intermediate the upper and lower extremities thereof, and being secured to the outer periphery of said vessel, and a baffle disposed above said trough, extending completely around the inner wall of said bell and attached thereto, said baffle being frusto-conical in configuration and converging downwardly and inwardly with the opening therein disposed vertically above said trough to direct material escaping from said vessel to said collecting trough, and a jacket forming the lower portion of said vessel, said jacket closely surrounding and confining the walls of said collecting crucible and being provided with cooling means for cooling said crucible and product.

5. A furnace for the production of a very pure metallurgical product by the reaction at very high temperatures of a mixture of reacting substances, comprising: a reaction vessel having the upper portion thereof lined with refractory material, said upper portion of said vessel having its upper end open for charging said vessel with said mixture of reacting substances and for removing the product resulting from the reaction of said reacting substances; a ceramic collecting crucible in the lower portion of said vessel with the upper edge of said crucible in contact with the lower edge of said refractory lining to form a continuous lining for said vessel, said crucible being disposed beneath said upper portion and being in continuous open communication with the interior of said upper portion for receiving therefrom the product of said substances reacting therein; and a jacket forming the lower portion of said vessel, said jacket closely surrounding and confining the walls of said collecting crucible and being provided with cooling means for cooling said crucible and product, a horizontal support plate having an aperture therein, said upper portion of said vessel having an upper part with a cross section larger than said aperture and a lower part with a cross section smaller than said aperture, said parts being joined by a connecting wall including a shoulder resting on said plate with said lower part and said jacket depending through said aperture and disposed below said plate, means for cooling said lower part; and a removable bell supported in sealed relation on said pate and disposed in spaced surrounding relation about said upper part providing a sealed vacuum chamber therearound.

6. A furnace for the production of a very pure metallurgical product by the reaction at very high temperatures of a mixture of reacting substances, comprising: a reaction vessel having the upper portion thereof lined with refractory material, said upper portion of said vessel having its upper end open for charging said vessel with said mixture of reacting substances and for removing the product resulting from the reaction of said reacting substances; a ceramic collecting crucible in the lower portion of said vessel with the upper edge of said crucible in contact with the lower edge of said refractory lining to form a continuous lining for said vessel, said crucible being disposed beneath said upper portion and being in continuous open communication with the interior of said upper portion for receiving therefrom the product of said substances reacting therein; a jacket forming the lower portion of said vessel; a metallic crucible disposed between said collecting crucible and said jacket, the lower edge of said refractory lining being in contact with the upper edge of both of said crucibles forming a continuous lining for said vessel, said jacket closely surrounding and confining the walls of said metallic crucibe and being provided with cooing means for cooling said crucibles and product, a horizontal support plate having an aperture therein, said upper portion of said vessel having a cross section larger than said aperture and said lower portion having a cross section smaller than said aperture, said portions being joined by a connecting wall forming a shoulder resting on said plate with said lower portion depending through said aperture and disposed below said plate, and a removable bell supported in sealed relation on said plate and disposed in spaced surrounding relation about said upper portion providing a sealed vacuum chamber therearound.

References Cited by the Examiner
UNITED STATES PATENTS

| | | | |
|---|---|---|---|
| 921,972 | 5/1909 | Gathmann | 22—177 X |
| 2,085,450 | 6/1937 | Rohn | 22—73 X |
| 2,089,030 | 8/1937 | Kratky | 75—10 |
| 2,323,265 | 6/1943 | Willetts | 266—43 X |
| 2,407,047 | 9/1946 | West | 266—31 X |
| 2,709,842 | 6/1955 | Findlay | 22—73 X |
| 2,971,871 | 2/1961 | Beggs. | |

FOREIGN PATENTS

| | | |
|---|---|---|
| 880,210 | 6/1953 | Germany. |
| 780,974 | 8/1957 | Great Britain. |

MORRIS O. WOLK, *Primary Examiner.*